United States Patent [19]

Molaire et al.

[11] Patent Number: 4,619,890

[45] Date of Patent: Oct. 28, 1986

[54] OPTICAL RECORDING ELEMENT HAVING A POLYMERIZED CROSSLINKED HOMOPOLYMER SMOOTHING LAYER

[75] Inventors: Michel F. Molaire, Rochester; Mark S. Kaplan, Webster, both of N.Y.

[73] Assignee: Eastman Kodak Company, Rochester, N.Y.

[21] Appl. No.: 766,992

[22] Filed: Aug. 19, 1985

[51] Int. Cl.$^4$ ............................................... G03C 1/00
[52] U.S. Cl. ........................... 430/495; 346/135.1; 346/76 L; 428/64; 428/195; 428/913; 430/281; 430/346; 430/945
[58] Field of Search ............... 430/281, 495, 346, 945; 428/64, 195, 913; 346/135.1, 76 L

[56] References Cited

U.S. PATENT DOCUMENTS

| | | | |
|---|---|---|---|
| 4,230,790 | 10/1980 | Hill | 430/288 |
| 4,322,490 | 3/1982 | Molaire | 430/281 |
| 4,446,223 | 5/1984 | Wadsworth et al. | 430/338 |

FOREIGN PATENT DOCUMENTS 2005155 4/1979 United Kingdom .

Primary Examiner—Jack P. Brammer
Attorney, Agent, or Firm—John R. Everett

[57] ABSTRACT

An optical recording element comprising a support having coated thereon a smoothing layer that is a crosslinked homopolymer in which the polymerized, crosslinked recurring unit is derived from a single monomer having the structure

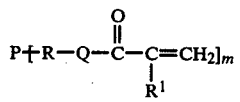

Q represents $-CH_2)_nO$ or $-CH_2CH_2O)_n$;
P represents a benzene or cyclohexane nucleus;
R represents

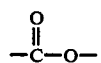

or $-O-$;
R$^1$ represents hydrogen or methyl;
n is 2 to 10; and
m is 2 to 4.

5 Claims, No Drawings

OPTICAL RECORDING ELEMENT HAVING A POLYMERIZED CROSSLINKED HOMOPOLYMER SMOOTHING LAYER

FIELD OF THE INVENTION

This invention relates to optical recording elements in which information is recorded by thermally deforming an optical recording layer. Such elements are useful in rapidly recording a large amount of information in a small area. These elements are useful for recording digital, video and audio information.

Recording on an optical recording element is accomplished by an information modulated beam of high energy density radiation such as a laser beam. The laser beam is focused onto the surface of the optical recording layer of the element. The recording layer absorbs energy from the light so that a small portion of the layer is deformed, thereby forming an information-bearing record element. The deformations may be in the form of pits, holes, or other changes in the material. This technique of optical recording on a heat-deformable recording layer is sometimes referred to in this art as ablative recording.

An important component of optical recording elements is a so-called smoothing layer. The smoothing layer is coated over the support to smooth out the support and to minimize noise and dropouts in optical recordings. The smoothing layer is then usually, in some optical recording elements, coated with a metal reflective surface. The recording layer is coated over the reflective layer.

The practice, as disclosed in U.S. Pat. No. 4,446,223, has been to use liquid polymerizable/crosslinkable compositions as the smoothing layer. After the coating solvents are evaporated from the smoothing layer formulation, surface tension tends to form a smooth liquid overcoat. The layer is then subjected to radiation energy for polymerization and crosslinking to produce a tack-free smooth film surface. However, the smoothing layer formed from the composition disclosed in U.S. Pat. No. 4,446,233 tends to be non-flexible and brittle. As a result, a smooth surface cannot always be preserved throughout the fabrication of an optical recording element.

SUMMARY OF THE INVENTION

The present invention provides an optical recording element comprising a support having coated thereon a smoothing layer that is a crosslinked homopolymer in which the polymerized, crosslinked recurring unit is derived from a single monomer having the structure

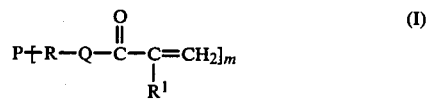

Q represents $-(CH_2)_nO-$ or $(CH_2CH_2O)_n$;
P represents a benzene or a cyclohexane nucleus;
R represents

or $-O-$;
$R^1$ represents hydrogen or methyl;
$n$ is 2 to 10; and
$m$ is 2 to 4.

The smoothing layer is flexible and nonbrittle, thus insuring a smoothing surface throughout the fabrication cycle of an optical recording element.

DETAILS OF THE INVENTION

The monomers useful in forming the smoothing layers used in the optical recording elements of the invention are polymerized and crosslinkable with radiant energy such as UV light. The monomers and methods for making them are disclosed in U.S. Pat. No. 4,322,490. Representative monomers useful herein are presented in Table I.

TABLE I

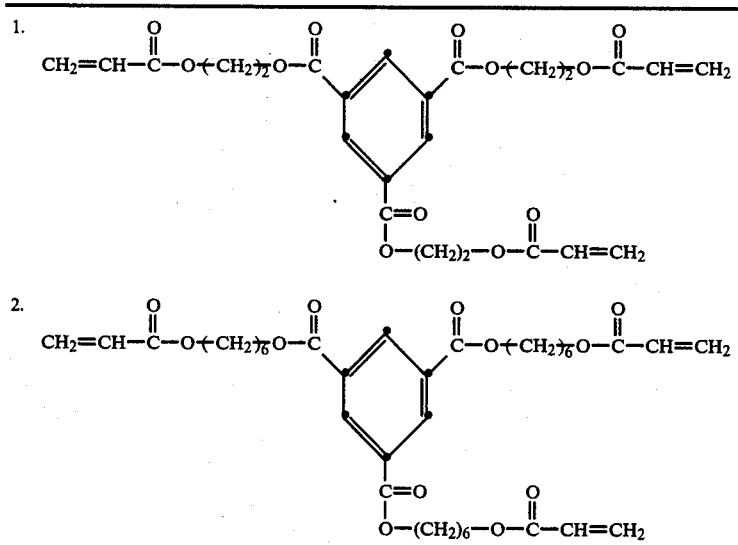

TABLE I-continued

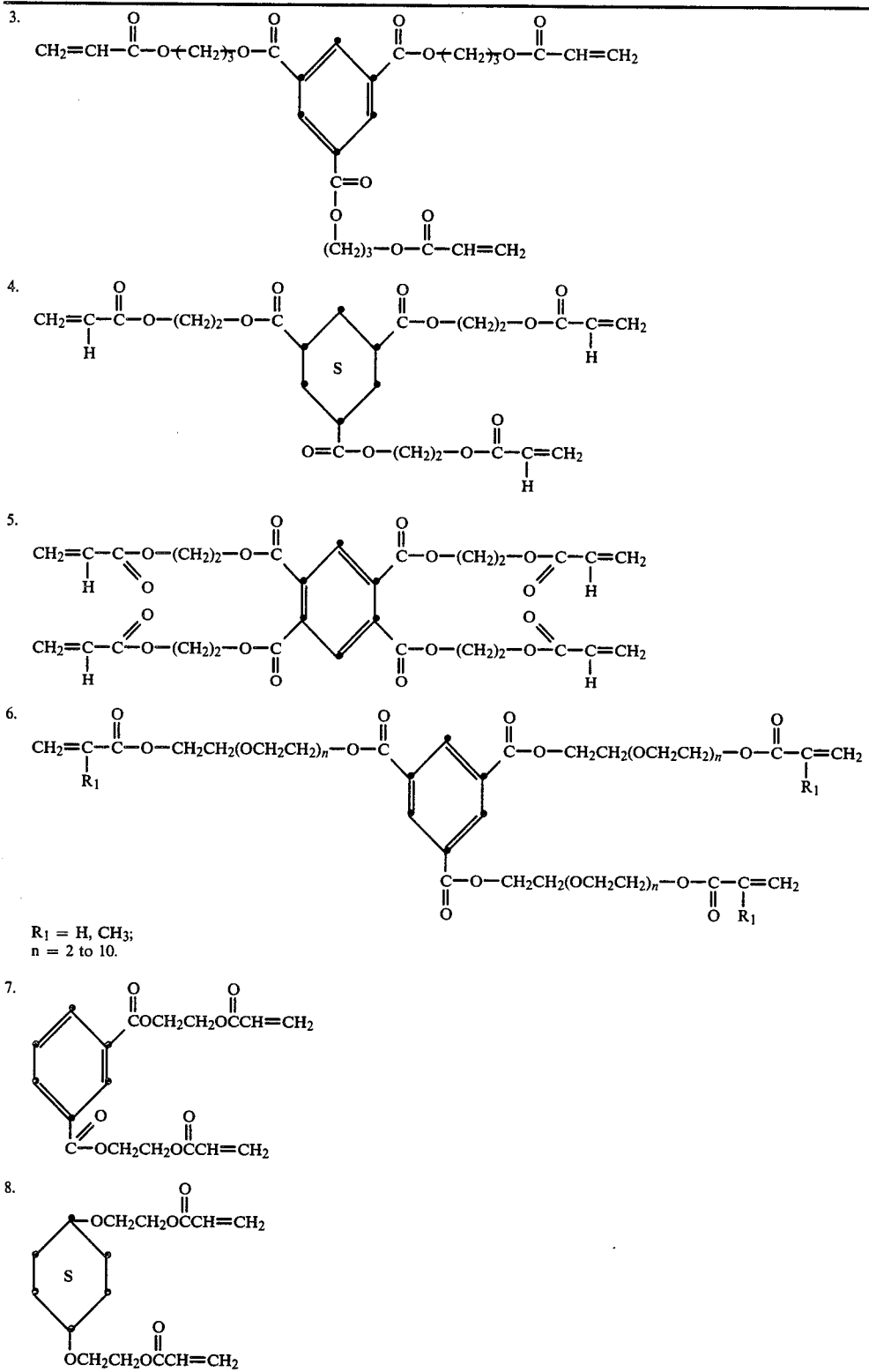

$R_1 = H, CH_3$;
n = 2 to 10.

The preferred optical recording elements of the invention comprise, in the following order, a support, a smoothing layer as disclosed herein, a metal reflective layer and an optical recording layer.

The support is any of a wide variety of materials including for example, glass plate or a resin film such as poly(ethylene terephthalate), poly(methyl methacrylate), poly(vinyl chloride), polystyrene or cellulose acetate, paper, clay, wood or metal. Important characteristics of the support are that it have a relatively high melting point (to avoid deformation during recording), have a very smooth surface (to minimize noise), and be capable of being coated with a layer of amorphous material, with good adhesion and no significant chemical reactivity between the layer and the useful support.

The support is coated with the smoothing layer formulation prior to the coating of the reflective layer and the recording layer.

The smoothing layer formulation may also includes a photoinitiator composition. The photoinitiator composition comprises, for example, an amine activator and a 3-ketocoumarin photosensitizer.

However, almost any photoinitiator composition is useful. A mixture of Michler's ketone and benzophenone is useful. Other compositions comprising an amine activator and a 3-ketocoumarin photosensitizer are described in *Research Disclosure*, December 1980, Item 20036 entitled "Photopolymerizable Compositions Featuring Novel Co-Initiators". The amount of the photoinitiator composition does not appear to be critical. Amounts between about 0.0002 and 0.2 mmole/gm of dry solids content are effective. Especially effective are amounts from about 0.001 to about 0.01 mmole/gm.

The following is a list of representative coumarin photosensitizers highly useful as one of the components of the photoinitiator composition:
3-(2-benzofuroyl)-7-diethylaminocoumarin;
3-(2-benzofuroyl)-7-(1-pyrrolidinyl)coumarin;
3-benzoyl-7-diethylaminocoumarin;
3-(o-methoxybenzoyl)-7-diethylaminocoumarin;
3-(p-dimethylaminobenzoyl)-7-diethylaminocoumarin;
3,3'-carbonylbis(5,7-di-n-propoxycoumarin);
3,3'-carbonylbis(7-diethylaminocoumarin);
3-benzoyl-7-methoxycoumarin;
7-diethylamino-3-[3-(2-thienyl)acryloyl]coumarin;
3-(2-furoyl)-7-diethylaminocoumarin;
3-(p-diethylaminocinnamoyl)-7-diethylaminocoumarin;
7-methoxy-3-(3-pyridylcarbonyl)coumarin and
3-benzoyl-5,7-dipropoxycoumarin.

Representative useful amine activators include ethyl p-dimethylaminobenzoate; other esters of p-dimethylaminobenzoic acid, e.g., n-butyl p-dimethylaminobenzoate, phenethyl p-dimethylaminobenzoate, 2-phthalimidoethyl p-dimethylaminobenzoate, 2-methacryloyloxyethyl p-dimethylaminobenzoate, pentamethylenebis(p-dimethylaminobenzoate); 4,4'-bis(-dimethylamino)benzophenone; phenethyl and pentamethylene esters of m-dimethylaminobenzoic acid; p-dimethylaminobenzaldehyde; 2-chloro-4-dimethylaminobenzaldehyde; p-dimethylaminoacetophenone; p-dimethylaminobenzyl alcohol; ethyl(p-dimethylamino)benzoyl acetate; p-piperidinoacetophenone; 4-dimethylaminobenzoin; N,N-dimethyl-p-toluidine; N,N-diethyl-m-phenetidine; tribenzylamine; dibenzylphenylamine; N-methyl-N-phenylbenzylamine; p-bromo-N,N-dimethylaniline; tridodecylamine; and 4,4',4"-methylidynetris(N,N-dimethylaniline) (crystal violet, leuco base).

The smoothing layer formulations are made by combining a structure I monomer and an appropriate solvent with a sensitizer and mixing at a constant temperature until solution is obtained. Then an activator is added to the solution and mixed until a clear solution is obtained. The order of combining the components is not essential. It is necessary, however, to obtain a clear solution.

In general, the smoothing layer formulations will comprise, on a dry weight to weight basis, from 50 to 93 percent of the selected formula I monomer; from 2 to 10 weight percent of activator; and when desired, 1 to 5 weight percent of the photosensitizer in an appropriate solvent.

It is also possible to induce polymerization and crosslinking of the $\alpha,\beta$-ethylenically unsaturated carbonyl substituted aliphatic and aromatic group with heat or using E beam energy without the use of a photoinitiator composition. It is also possible to coat the polymerizable crosslinkable monomer without a solvent, using techniques such as gravure printing. Temperatures in the range of from 40° to 120° C. are useful in promoting polymerization and crosslinking of the monomer.

The formulations may also contain a solvent such as dichloromethane, 2-ethoxyethanol, toluene, heptane and other suitable solvents to facilitate coating. After coating, any solvent used is allowed to evaporate to obtain a dried coated layer of the photocurable composition.

The coated formulation is then exposed to UV radiation. The radiation causes the monomer to polymerize and crosslink, thus, curing the layer.

Following coating, polymerization of the fluid produces a smooth surface on the support. The thus formed smoothing layer is made reflective by vacuum metalization of the smooth surface. Useful metals for this purpose include gold and aluminum.

Useful recording layers, comprising a dye and a binder, are coated by any of a wide variety of methods. Most conveniently, the dye and binder are coated from a common solvent or, alternatively, from a mixture of miscible solvents. The dye-binder composition is coated by spray coating, air knife coating, whirl coating or by any other suitable method. The thickness of the recording layer according to the present invention is not critical; however, best results are obtained when the thickness of the layer is between about 0.1 and about 10 microns. Useful dyes and binders are disclosed in U.S. Pat. No. 4,380,769 and U.S. Pat. No. 4,499,165. These patents also describe in detail methods for making the recording layer. Other useful recording elements having heat-deformable recording layers include metallic or alloy layers.

Optimization of the recording elements of the present invention is described in U.S. Pat. No. 4,360,908 of Howe and Wrobel. Preferred disc configurations are described in U.S. Pat. No. 4,447,899.

The following examples are presented to further illustrate how to make and use the invention.

EXAMPLE 1

| Smoothing Layer Formulation | mg/m$^2$ (mg/ft$^2$) |
| --- | --- |
| Monomer 1, Table I | 863.6 (802) |
| 3-benzoyl-5,7-dipropoxy-coumarin as a sensitizer | 236.8 (22) |
| ethyl p-dimethylamino-benzoate as an activator | 473.6 (44) |
| Fluorad FC431 a (nonionic fluoro-chemical surfactant sold by 3M Co.) | 64.6 (6) |

The above formulation was machine coated on a polyester support in dichloromethane or 1,1,1-trichloroethane at about 15% solids by pumping the formulation through a coating hopper at a speed of about 22.8 meters/min (75 fpm) to produce a dried layer about 5 micrometers thick. Polymerization and crosslinking was accomplished by exposing the smoothing layer to a 3000 W.Hg light source focused at the web for about 0.1 second. A metal reflecting layer was vacuum deposited on the smoothing layer. Microscopic evaluation of the reflecting layer revealed a nearly featureless surface.

EXAMPLE 2

Prior Art Smoothing Layer

A prior art multi-component formulation, composed of Hughson 63A acrylated urethane resin, 431 g/m$^2$ (401 mg/ft$^2$), Chemlink 41D, 431 g/m$^2$ (40 gm/ft$^2$) and the same amount of sensitizer, activator and solvent as was used in Example 1, was coated under conditions similar to those of Example 1. Hughson 63A is a mixture of urethane acrylate, along with unspecified oligomers and ethylenically unsaturated monomers. Chemlink 41D is itself a mixture of acrylates of pentaerythritol, sold by Ware Chemical Co. A metal reflective layer was applied to the smoothing layer as in Example 1.

A wedge brittleness test (ANSI PH 1.31-1973) was performed in the coatings of Examples 1 and 2 (prior art). The wedge brittleness test was performed by conditioning sample strips of each coating at 21° C. and 50 percent relative humidity, pulling a loop of each strip, coating side outwards, through a 9° wedge-shaped device as described in the ANSI PH 1.31-1973 standard, and recording the distance in inches between the legs of the wedge where the first cracks occured, this distance representing the diameter of the loop when the cracks occured.

A curl test (ANSI PH 1.29-1971) was also performed on the coatings of Examples 1 and 2. The curl test was performed by conditioning sample strips at 21° C. and 50 percent relative humidity, then matching the curl of each sample on a template of curves of varying radii to determine the radius of curvature and reporting the value of 100/R as the degree of curl where R is the radius of curvature in inches. To use metric units, the degree of curl is reported as 254/R where R is in centimeters.

The results of these experiments are tabulated in Table I.

A comparison of this prior art smoothing layer with the smoothing layer of Example 1 is tabulated in Table II.

TABLE II

|  | 254/R cm -ANSI Curl | cm (b) Wedge Brittleness | Surface Quality Comments |
|---|---|---|---|
| Monomer 1, Table I | 30.48 | 0.36 | OK-no pimples with single pass |
| Hughson/Chemlink | 71.12 | 0.76 | micropimples with one pass |

A one pass coating was found sufficient for good smoothing performance of monomer I while two passes were necessary for good smoothing performance when the multi-component prior art smoothing layer was used. By a one pass coating we mean that the coated element was not passed through the coating machine a second time to further smooth the layer at the expense of increasing the thickness of the smoothing layer. Also, the smoothing layer of the invention exhibited less curl and less brittleness than the prior art smoothing layer.

EXAMPLE 3

A formulation comprising monomer 4 of Table I was spin coated side by side with the prior art smoothing layer formulation of Example 2. Complete optical recording elements were then prepared with each formulation for performance evaluation of carrier-to-noise ratio (CNR). The complete elements were prepared and evaluated as described in Example 15 of U.S. Pat. No. 4,499,165. The reflective layer was Cr/Au (11 Å°/1405 Å°). The recording layer was a dye and binder layer comprising bis[4-benzyl-5-(4-methoxyphenyl)dithiolene]nickel and bis(4-phenyl-5-isopropyldithiolene)nickel and the binder was

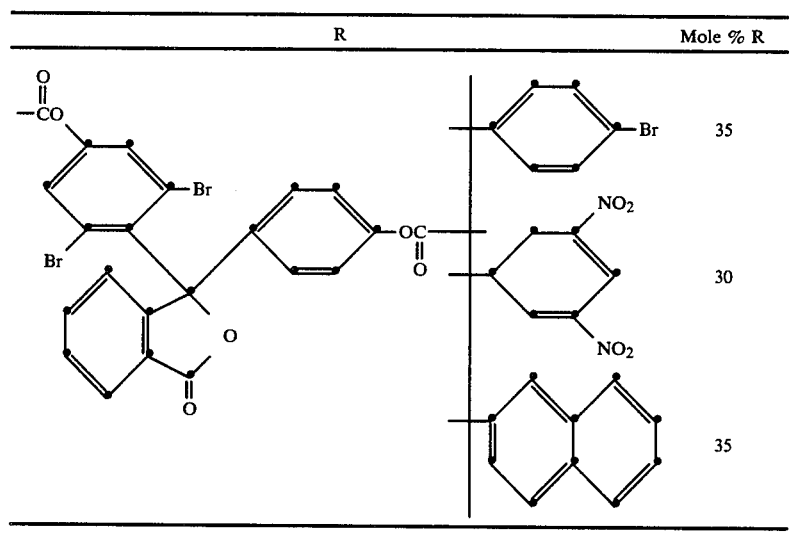

The results are shown in Table III.

TABLE III

| | Read/Write Performance Data | |
|---|---|---|
| | Max CNR (db) | CNR at 10 MW (db) |
| Prior Art | 66.6 | 62.70 |
| Monomer 4 formulation | 67.10 | 64.2 |

The monomer 4 formulation resulted in improved CNR performance compared to the control. The formulation of this example was also found to exhibit less brittleness and cure than the prior art formulations.

EXAMPLE 4

A surface-smoothing formulation was prepared, coated and cured as described in Example 3 using monomer 5 of Table I. A hard crosslinked polymer was formed on UV irradiation. Metallization of the resulting smoothing layer was followed by microscopic analysis of the metal surface. This analysis revealed that surface-smoothing had taken place.

EXAMPLE 5

Example 4 was repeated except the smoothing layer monomer was monomer 8 of Table I. A smooth surface was observed on the metal layer.

The invention has been described in detail with particular reference to preferred embodiments thereof, but it will be understood that variations and modifications can be effected within the spirit and scope of the invention.

We claim:

1. An optical recording element comprising a heat-deformable optical recording layer and a support having coated thereon a smoothing layer that is a crosslinked homopolymer in which the polymerized, crosslinked recurring unit is derived from a single monomer having the structure

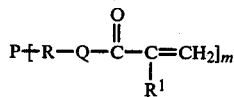

Q represents $-CH_2)_nO$ or $-CH_2CH_2O)_n$;
P represents a benzene or cyclohexane nucleus;
R represents

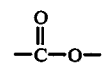

or $-O-$;
$R^1$ represents hydrogen or methyl;
n is 2 to 10; and
m is 2 to 4.

2. An optical recording element comprising in the following order;
   a support;
   a smoothing layer;
   a metal reflective layer; and
   a heat-deformable optical recording layer wherein the smoothing layer is a crosslinked homopolymer in which the polymerized recurring unit is derived from a single monomer having the structure

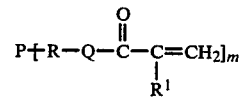

Q represents $-CH_2)_nO$ or $-CH_2CH_2O)_n$;
P represents a benzene or cyclohexane nucleus;
R represents

or $-O-$;
$R^1$ represents hydrogen or methyl;
n is 2 to 10; and
m is 2 to 4.

3. The optical recording element of claim 1 or 2 wherein n is 2 to 6 and m is 3.

4. The element of claim 1 or 2 wherein the polymerized recurring unit in the crosslinked homopolymer is derived from a single monomer selected from the group consisting of

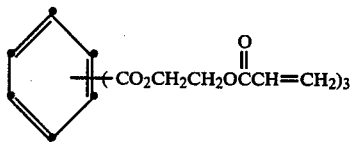

and

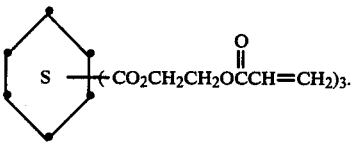

5. The element of claim 1 or 2 wherein the heat-deformable optical recording layer comprises an amorphous composition having an absorption factor of at least 20 and comprises a binder and a dye.

* * * * *